(12) United States Patent
Cai et al.

(10) Patent No.: US 10,962,244 B2
(45) Date of Patent: Mar. 30, 2021

(54) HUMIDIFIER

(71) Applicant: Foshan Jinxinghui Electrical Appliance Co., LTD., Foshan (CN)

(72) Inventors: Jingbo Cai, Foshan (CN); Xiong Yang, Foshan (CN)

(73) Assignee: Foshan Jinxinghui Electrical Appliance Co., LTD., Foshan (CN)

( * ) Notice: Subject to any disclaimer, the term of this patent is extended or adjusted under 35 U.S.C. 154(b) by 261 days.

(21) Appl. No.: 15/978,421

(22) Filed: May 14, 2018

(65) Prior Publication Data
US 2019/0293309 A1 Sep. 26, 2019

(30) Foreign Application Priority Data
Mar. 22, 2018 (CN) .......................... 201810240001.1

(51) Int. Cl.
| F24F 6/02 | (2006.01) |
| F24F 6/12 | (2006.01) |
| F24F 13/20 | (2006.01) |
| F24F 6/00 | (2006.01) |
| G05D 9/12 | (2006.01) |
| B01F 3/04 | (2006.01) |

(52) U.S. Cl.
CPC ................. F24F 6/02 (2013.01); F24F 6/12 (2013.01); F24F 13/20 (2013.01); B01F 3/04021 (2013.01); F24F 2006/008 (2013.01); G05D 9/12 (2013.01); Y02B 30/70 (2013.01); Y10T 137/7501 (2015.04)

(58) Field of Classification Search
CPC .......... F24F 6/12; F24F 2006/008; F24F 6/02; F24F 13/20; F24F 11/30; F24F 6/08; Y02B 30/70; B01F 3/04021; G05D 9/12; Y10T 137/7501; F16K 11/00
See application file for complete search history.

(56) References Cited

U.S. PATENT DOCUMENTS

| 4,087,495 A | * | 5/1978 | Umehara ................. F24F 6/12 261/81 |
| 4,257,989 A | * | 3/1981 | Nishikawa ............. B05B 12/08 261/4 |

(Continued)

FOREIGN PATENT DOCUMENTS

| CN | 104197459 A | 12/2014 |
| CN | 104566744 A | 4/2015 |
| CN | 206429679 U | 8/2017 |

OTHER PUBLICATIONS

"Camp (tool)" Wikipedia published Dec. 16, 2015 accessed at <https://en.wikipedia.org/w/index.php?title=Clamp_(tool)&oldid=695500954> (Year: 2015).*

(Continued)

Primary Examiner — Stephen Hobson
(74) Attorney, Agent, or Firm — Edwin A. Sisson, Attorney at Law, LLC; Jeffrey J. Banyas

(57) ABSTRACT

A humidifier is provided, comprising: a pedestal, a water tank, a water storage chamber, an atomizer, a mist discharge passage, and a water flow control device. The humidifier further comprises an enclosure which is open in its upper portion and used for avoiding water leakage. The lowest point at an upper end of the enclosure is higher than the highest water level in the water tank after leakage.

9 Claims, 12 Drawing Sheets

(56) References Cited

U.S. PATENT DOCUMENTS

| | | | | |
|---|---|---|---|---|
| 4,663,091 | A * | 5/1987 | Seo | A61L 2/035 210/748.01 |
| 5,483,616 | A * | 1/1996 | Chiu | F24F 6/043 261/107 |
| 5,792,390 | A * | 8/1998 | Marino | F24F 6/00 215/359 |
| 6,244,576 | B1 * | 6/2001 | Tsai | F24F 6/02 261/141 |
| 7,654,508 | B2 * | 2/2010 | Wegner | F24F 6/14 261/34.1 |
| 9,157,644 | B2 * | 10/2015 | Hou | F24F 6/02 |
| 9,316,405 | B2 * | 4/2016 | Moon | F24F 3/1603 |
| 10,161,643 | B2 * | 12/2018 | Son | F24F 6/04 |
| 2011/0156288 | A1 * | 6/2011 | Ahn | F24F 6/12 261/30 |
| 2012/0234166 | A1 * | 9/2012 | Markham | F24F 3/1603 95/214 |
| 2014/0151907 | A1 * | 6/2014 | Kanel | F24F 6/02 261/133 |
| 2016/0356514 | A1 * | 12/2016 | Cai | F24F 11/0008 |
| 2017/0082306 | A1 * | 3/2017 | Murakami | F24F 3/14 |
| 2017/0122588 | A1 * | 5/2017 | Lee | F24F 6/14 |
| 2019/0024915 | A1 * | 1/2019 | Cai | F24F 6/12 |
| 2019/0041086 | A1 * | 2/2019 | Atkins, Jr. | F24F 6/12 |

OTHER PUBLICATIONS

Philips Respironics Tank Bottom for DreamStation Go Heated Humidifier Chambers _ cpapdirect.com (Year: 2020) (Year: 2020).*

* cited by examiner

HUMIDIFIER

CROSS REFERENCE TO RELATED APPLICATION

The present application claims the priority of Chinese Patent Application NO. 201810240001.1, filed on Mar. 22, 2018, the disclosure of which is incorporated by reference herein in its entirety.

TECHNICAL FIELD

The present application relates to the field of humidifiers.

BACKGROUND

With the improvement of living conditions, people propose higher requirements on the comfort of the living environment. Air humidity is one of important factors that influence the comfort. Especially in the north of China and in any places that require air-conditioning for a long term, the air humidity is relatively low. Therefore, humidifiers are increasingly indispensable to people's lives.

At present, in order to ensure that water in the humidifier will not immerse into the fan, electrical components or even the surrounding environment in case of water leakage from the water tank, the combination of a humidifier housing and a water storage tank is generally used. That is, a cavity formed by the humidifier housing is used as the water storage tank. However, this structure has some obvious disadvantages. The water storage tank cannot be taken out from the humidifier, so that it is disadvantageous for the maintenance and cleaning of the humidifier. Moreover, in this structural design, inevitably, a user needs to move the whole humidifier to complete a water storage action or move a water supply to directly feed water into the humidifier, so that it is inconvenient for operation, and it is likely to cause potential safety hazards particularly for the elderly or children. For example, Chinese Patent Application No. CN106969461A, entitled ULTRASONIC HUMIDIFIER TO WHICH WATER IS SUPPLIED FROM THE TOP, has disclosed an ultrasonic humidifier to which water is supplied from the top, including a pedestal and a housing arranged on the pedestal; the housing is of a hollow cavity structure having a water storage function; a water inlet for feeding water and a mist outlet for discharging mist are formed on the top of the housing; an ultrasonic atomization device capable of communicating with the hollow cavity is provided on the pedestal; and, the height H of the housing is less than or equal to a first preset value.

SUMMARY

To overcome the deficiencies in the prior art, the present application provides a humidifier which has the advantages of overall stability, resistance to water leakage, backflow resistance, ease of disassembly and cleaning, high fan efficiency, firm structure, high reliability, high safety coefficient, ease of operation, neat and high-grade appearance, and optimized performance.

The present application mainly employs the following technical solutions.

A humidifier is provided, including: a pedestal, a water tank having a water outlet formed thereon, a water storage chamber provided on the pedestal, an atomizer mounted in the water storage chamber, a mist discharge passage by which mist generated by the atomizer is discharged from the humidifier, and a water flow control device for controlling the opening or closing of the water outlet to enable water in the water tank to enter the water storage chamber, wherein the humidifier further includes an enclosure which is open in its upper portion and used for avoiding water leakage, the water tank is detachably arranged within the enclosure, and the lowest point at an upper end of the enclosure is higher than the highest water level in the water tank after leakage.

The humidifier further includes a wind duct and a fan; the wind duct leads wind from the fan into the mist discharge passage; the wind duct includes an upper wind duct and a lower wind duct; a wind outlet of the upper wind duct is located in an upper portion of the humidifier and communicated with the lower wind duct; and, the horizontal height of the lowest point at the wind outlet of the upper wind duct is higher than the highest water level in the water tank after leakage.

The upper wind duct is arranged on the enclosure.

An inner cavity is formed in the mist discharge passage and/or an inner cavity is formed in the water tank.

The wind outlet of the upper wind duct is communicated with the inner cavity, and the inner cavity in the mist discharge passage and/or the inner cavity in the water tank forms the lower wind duct.

The lower wind duct further includes a lower wind duct wall which is clamped into the inner cavity.

The mist discharge passage and the water tank are arranged independently, a cavity is formed within the water tank, and the mist discharge passage is completely or partially located within the cavity The humidifier further includes a heating device; a water inlet is further formed in an upper portion of the water tank; the mist discharge passage is arranged right above the atomizer so that a water energy column generated by the atomizer during its operation is located within the mist discharge passage; and, the fan blows out vapor generated by the heating device and water mist generated by the atomizer.

The water flow control device includes a detection and driving mechanism and a water outlet portion; the water outlet portion is arranged at the water outlet, and has a first water outlet hole and a second water outlet hole which are connected in series; valves are provided at the first water outlet hole and the second water outlet hole, respectively; the valves act as per a signal generated by the detection and driving mechanism to open or close the first water outlet hole and the second water outlet hole; and, the valves are able to separately close the first water outlet hole and the second water outlet hole.

Each of the valves includes a valve seat, a valve core, a water seal and a restoration member, and the valve core acts as per a signal generated by the detection and driving mechanism to open or close the first water outlet hole and the second water outlet hole via the water seal and the restoration member.

The valve core includes a first valve core and a second valve core; the water seal includes a first water seal and a second water seal; the first valve core is connected to the first water seal, and the second valve core is connected to the second water seal; a linkage mechanism is provided between the first valve core and the second valve core; and, when the first water outlet hole and the second water outlet hole are opened, the linkage mechanism allows the displacement of the second water seal relative to the second water outlet hole to be greater than the displacement of the first water seal relative to the first water outlet hole.

The linkage mechanism is an ejector formed on the top of the second valve core, and the ejector is fitted with the bottom of the first valve core; and, the first water seal is located above the first water outlet hole and the second water seal is located above the second water outlet hole.

The linkage mechanism is a soft linkage member provided on the top of the second valve core, and the soft linkage member is inserted into the bottom of the first valve core; and, the first water seal is located below the first water outlet hole and the second water seal is located below the second water outlet hole.

The linkage mechanism includes a bevel provided on the second valve core and a bevel chute provided on the first valve core, and the bevel is inserted into the bevel chute and able to drive the first valve core to move; and, the first valve core and the second valve core are arranged at an angle.

The valve core includes a first valve core and a second valve core; the water seal includes a first water seal and a second water seal; the first valve core is fitted with the first water seal, and the second valve core is fitted with the second water seal; a linkage mechanism is provided between the first valve core and the second valve core; the linkage mechanism is an ejector formed on the top of the second valve core; and, the ejector is fitted with the bottom of the first valve core.

A first water flow hole and a first release hole are formed on the first valve core, and a second water flow hole and a second release hole are formed on the second valve core; the first water flow hole is fitted with the first water seal, and the second water flow hole is fitted with the second water seal; each of the first valve core and the second valve core has a hollow structure; the hollow structures form a first water flow passage and a second water flow passage, respectively; and, the first water flow hole and the first release hole are communicated with the first water flow passage, and the second water flow hole and the second release hole are communicated with the second water flow passage.

The inner diameter of the first water flow hole is less than that of the second water flow hole.

In the technical solutions provided by the present application, the enclosure is open in its upper portion and able to avoid water leakage and the lowest point at the upper end of the enclosure is higher than the highest water level in the water tank after leakage, so that it can be effectively ensured that water will not flow out of the humidifier even in case of water leakage from the water tank or too high water level in the water storage chamber; the water tank is detachably arranged within the enclosure, so that it is disadvantageous for a user to feed water; the mist discharge passage and the water tank are arranged independently and the mist discharge channel is detachably arranged within the enclosure, so that is it convenient for disassembling and cleaning water scale; the structural arrangement of the upper and lower wind ducts effectively ensures that water will not flow back into the fan and the electrical components through the wind outlet of the lower wind duct, and increases the mechanical strength of the relevant components so as to achieve the effect of reinforcing ribs, so that the wind strength of the fan is guaranteed effectively, it is convenient for the user's operation and the humidifier looks neat and high-grade; when one of water outlet holes of the water outlet portion cannot be closed normally, it still can be ensured that the humidifier can operate normally without water leakage; moreover, the double-valve structure used in the present application can decrease the water leakage probability of the humidifier to between one millionth and ten millionth, so that the reliability of the machine is improved greatly, and the humidifier is higher in safety coefficient and more excellent in performance.

BRIEF DESCRIPTION OF THE DRAWINGS

FIG. 12 is a cross-sectional view of the water outlet portion of the humidifier in Embodiment 4 of the present application, in which:

Figure 1:
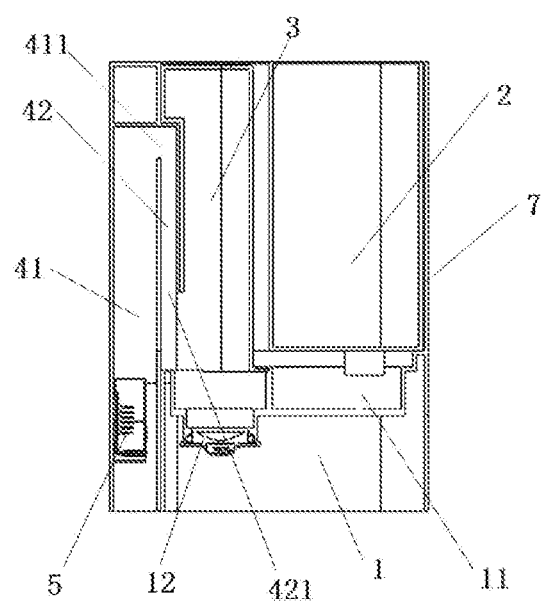
FIG. 1 is a laterally sectional view of the humidifier, where the enclosure is a housing and includes a panel, the upper wind duct is located within the panel, and the lower wind duct is located within an inner cavity of the mist discharge passage.
Figure 2:
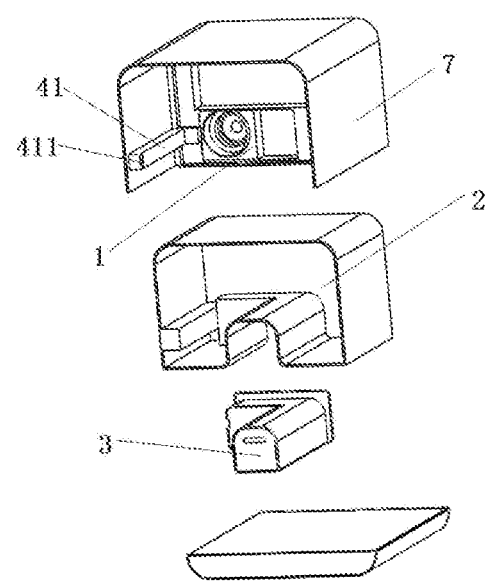
FIG. 2 is an exploded view of the humidifier, where the enclosure is a housing and includes a panel, the upper wind duct is located on the housing, both the upper wind duct and the lower wind duct are located within an inner cavity on an outer wall of the water tank, and the mist discharge passage is separated from both the water tank and the enclosure.
Figure 3:
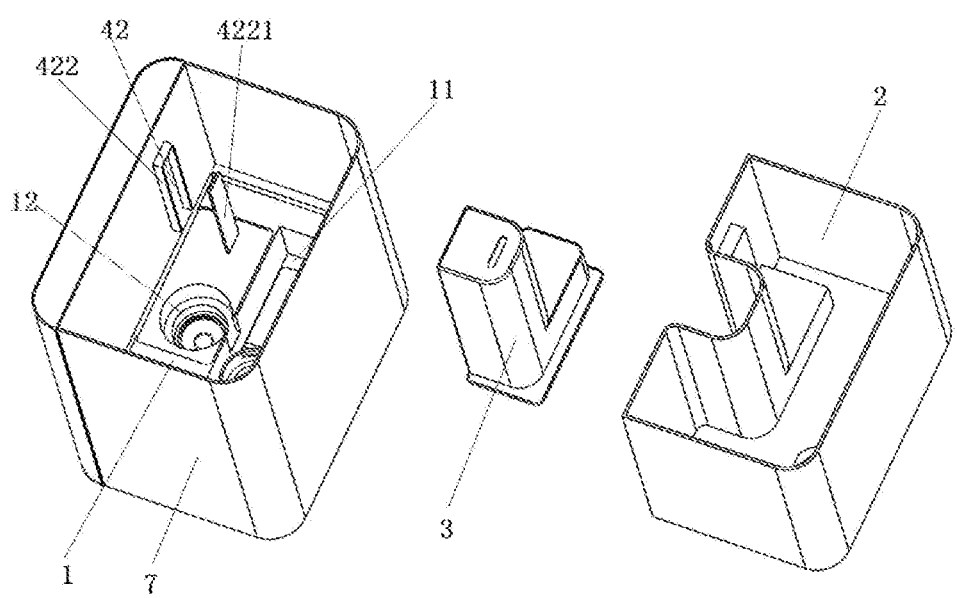
FIG. 3 is an exploded view of the humidifier, where the enclosure is a housing and includes a panel, the upper wind duct is located within the panel, the lower wind duct is located within an inner cavity on an outer wall of the water tank, the mist discharge passage is separated from both the water tank and the enclosure, and the front section of the lower wind duct wall is n-shaped.
Figure 4:
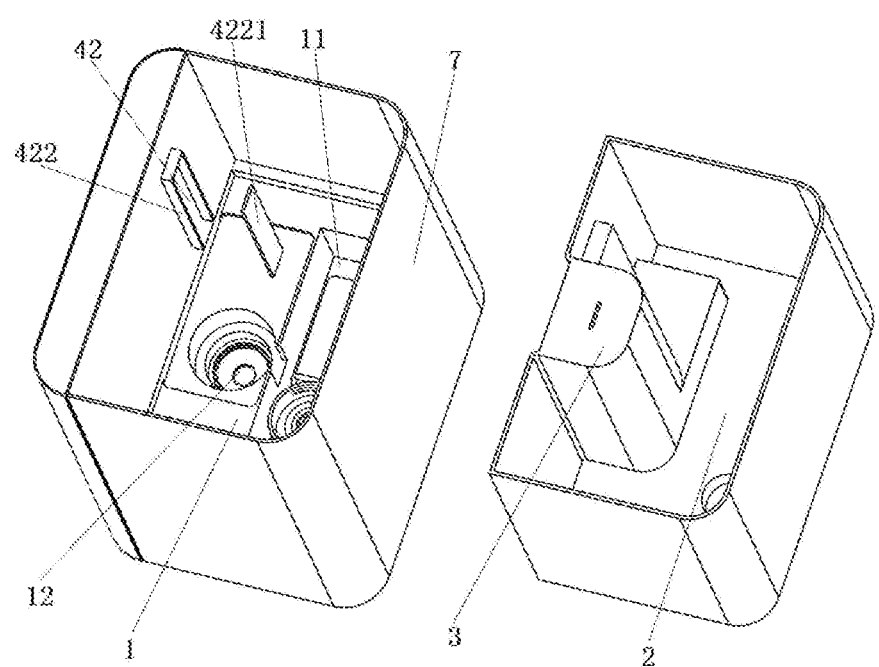
FIG. 4 is an exploded view of the humidifier, where the enclosure is a housing and includes a panel, the upper wind duct is located on the panel, the lower wind duct is located within an inner cavity on an outer wall of the water tank, the mist discharge passage is completely fitted with the water tank, and the front section of the lower wind duct wall is n-shaped.
Figure 5:
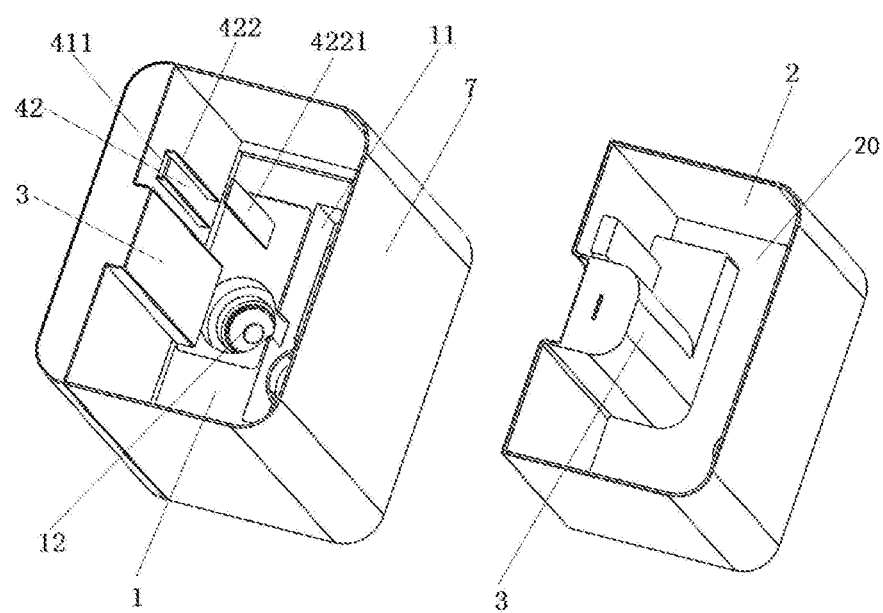
FIG. 5 is an exploded view of the humidifier, where the enclosure is a housing and includes a panel, the upper wind duct is located on the panel, the lower wind duct is located within an inner cavity on an outer wall of the water tank, the mist discharge passage is partially fitted with the water tank and the enclosure, and the front section of the lower wind duct wall is 11-shaped.
Figure 6:
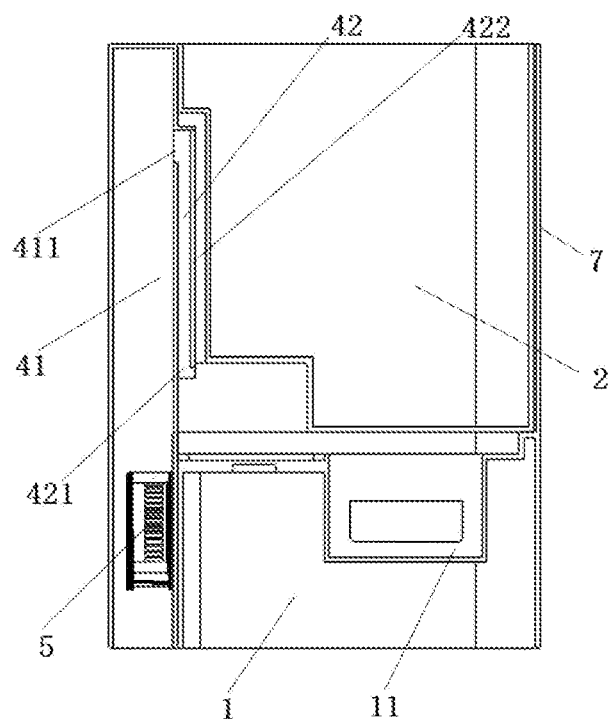
FIG. 6 is a laterally section view of the lower wind duct wall having a n-shaped front section of FIG. 3 and FIG. 4.
Figure 7:
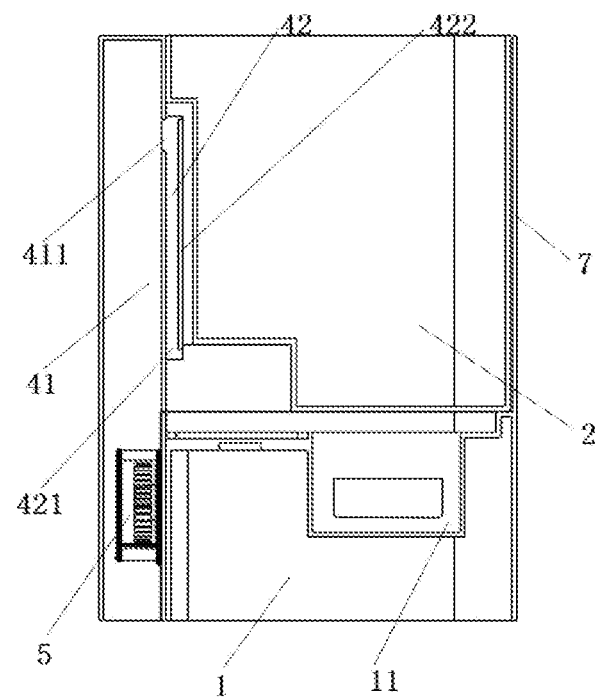
FIG. 7 is a laterally section view of the lower wind duct wall having a 11-shaped front section of FIG. 5.
Figure 8:
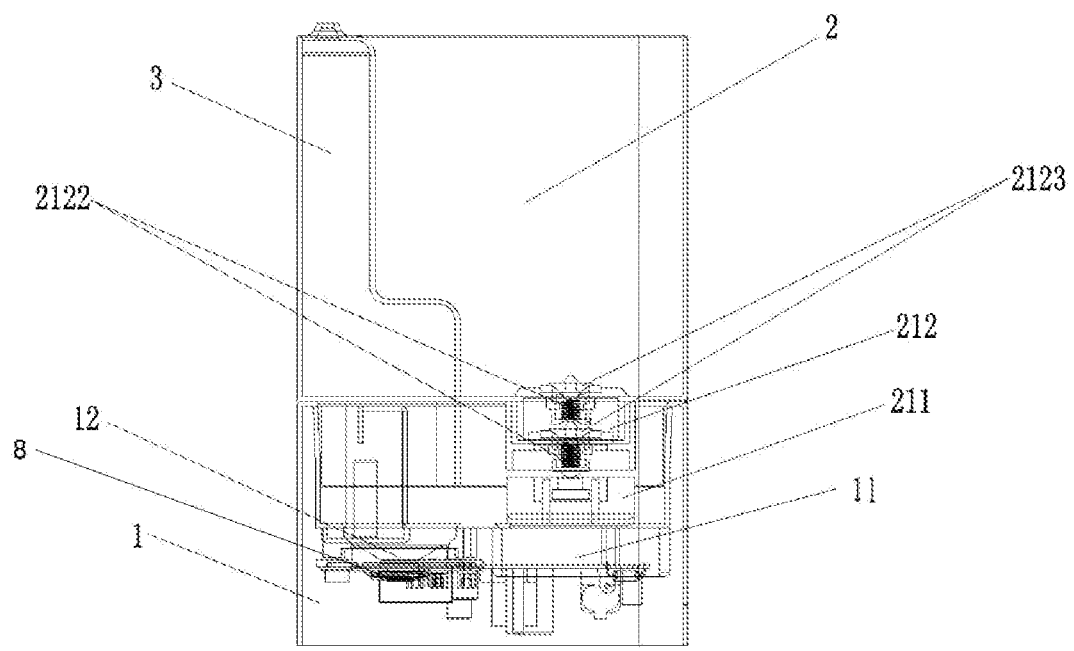
FIG. 8 is a sectional view of a double-valve structure of a water outlet portion of the humidifier.

1: pedestal; 2: water tank; 3: mist discharge passage; 5: fan; 11: water storage chamber; 12: atomizer; 41: upper wind duct; 42: lower wind duct; 411: wind outlet of the upper wind duct; 421: wind outlet of the lower wind duct; 422: lower wind duct wall; 4221: lower wind duct plate; 7: enclosure; 211: detection and driving mechanism; 212: water outlet portion; 2121: valve seat; 2122: vale core; 2123: water seal; 2124: restoration member; 21210: water flow cavity; 21201: first water outlet hole; 21202: second water outlet hole; 21221: first valve core; 21222: second valve core; 21231: first water seal; 21232: second water seal; 21220: linkage mechanism; 212211: first water flow hole; 212212: first release hole; 212221: second water flow hole; 212222: second release hole.

DETAILED DESCRIPTION

The technical solutions of the present application will be further described below with reference to the accompanying drawings.

As shown in FIGS. 1 to 7, a humidifier includes: a pedestal 1, a water tank 2 having a water outlet formed thereon, a water storage chamber 11 provided on the pedestal 1, an atomizer 12 mounted in the water storage chamber 11, a mist discharge passage 3 by which mist generated by the atomizer 12 is discharged from the humidifier, and a water flow control device for controlling the opening or closing of the water outlet to enable water in the water tank 2 to enter the water storage chamber 11. The humidifier further includes an enclosure 7 which is open in its upper portion and used for avoiding water leakage. The water tank 2 is detachably arranged within the enclosure 7. The lowest point at an upper end of the enclosure 7 is higher than the highest water level in the water tank 2 after leakage. Preferably, the lowest point at the upper end of the enclosure 7 may be higher than the horizontal height of the water level in the enclosure 7 when water in the water tank 2 falls from the highest working water level of the water tank and overflows into the enclosure 7 after leakage from the water tank 2. Since the water tank is detachably arranged within the enclosure, it is advantageous for a user to take out the water tank from the humidifier for feeding water, so that there is no need to move the humidifier as a whole, and the safety coefficient is higher. Preferably, the enclosure is closed and has no any hollow design or through hole. In this way, when the water level in the water storage chamber is too high due to the water leakage from the water tank, water may be prevented from leaking from the humidifier and wetting the external environment, thereby resulting in safety accidents. Preferably, the enclosure 7 may be a housing which is arranged on an outer wall of the pedestal 1 and extends upward in a vertical direction, including but not limited to, extending upward in an integration manner or extending upward in a sealed connection manner. The enclosure 7 further includes a panel which is arranged at a front end of the outer wall of the pedestal 1 and has a hollow structure. Left and right edges of the panel are connected to the housing in a sealed manner, and an operating interface and a display interface are further provided on the panel. By this structural design, the humidifier looks more high-grade.

As shown in FIGS. 1 to 7, the humidifier further includes a wind duct and a fan 5. The wind duct leads wind from the fan 5 into the mist discharge passage 3. The wind duct includes an upper wind duct 41 and a lower wind duct 42. A wind outlet 411 of the upper wind duct is located in an upper portion of the humidifier and communicated with the lower wind duct 42. The height of the lowest point at the wind outlet 411 of the upper wind duct is higher than the highest water level in the water tank 2 after leakage. Preferably, the horizontal height of the lowest point at the wind outlet 411 of the upper wind duct is higher than the horizontal height of the water level in the enclosure 7 when water in the water tank 2 falls from the highest working water level of the water tank and overflows into the enclosure 7 after leakage from the water tank 2. Preferably, the fan 5 is arranged in a lower portion of the humidifier. In this structural design, it is effectively ensured that the center of gravity of the humidifier is in its lower portion and the whole humidifier is more stable. Preferably, the fan 5 is arranged within the upper wind duct 41 or the wind outlet of the fan 5 is communicated with the wind inlet of the upper wind duct 41, the electrical components of the humidifier may also be arranged within the upper wind duct 41 or at a safe position formed by the separation function of the upper wind duct 41. In this structural design, water can be effectively prevented from flowing back to the fan and the electrical components from the wind outlet of the lower wind duct when the water level in the water storage chamber is too high, so that the components are safer. The wind outlet of the upper wind duct is located in the upper portion of the humidifier and communicated with the lower wind duct, and the horizontal height of the lowest point of the wind outlet of the upper wind duct is higher than the horizontal height of the water level in the enclosure when water in the water tank falls from the highest working water level of the water tank and overflows into the enclosure after the water leakage from the water tank. In this structural design, it can be effectively ensured that water will not flow back to the wind outlet of the upper wind duct from the wind outlet of the lower wind duct even in case of the water leakage from the water tank. Moreover, when the water level of the leaked water rises and the water level of water in the water tank lowers, since the wind outlet of the upper air duct is located at a higher position, due to the air pressure, water will not flood the wind outlet of the upper wind duct even when the level of leaked water rises to a certain height.

As shown in FIGS. 1 to 7, the upper wind duct 41 is arranged on the enclosure 7. Preferably, when the enclosure 7 is a housing, the upper wind duct 41 is arranged on the housing. Further, when the enclosure 7 further includes a panel, the upper wind duct 41 is arranged within the panel.

As shown in FIGS. 1 to 7, an inner cavity is formed in the mist discharge passage 3 and/or an inner cavity is formed in the water tank 2. Preferably, the inner cavity is located on a side of an outer wall of the mist discharge passage 3 and/or the water tank 2 resisted against the enclosure 7. Preferably, an inner cavity is formed in the mist discharge passage 3 and/or an inner cavity is formed in the outer wall of water tank 2; and, the inner cavity may be linear or bent, and the extension direction of the inner cavity is not limited. The structural design of the inner cavity plays a role of a reinforcing rib, and can improve the mechanical strength of the components.

As shown in FIGS. 1 to 7, the wind outlet 411 of the upper wind duct is communicated with the inner cavity, and the inner cavity forms the lower wind duct 42. Preferably, the inner cavity and the enclosure 7 form the lower wind duct 42. Preferably, the upper air duct 41 and the lower wind duct 42 form an n-shaped or π-shaped structure. Preferably, the upper air duct 41 and/or the lower wind duct 42 is linear, or the upper air duct 41 and/or the lower wind duct 42 may be arranged in a vertical direction or arranged at a certain included angle relative to the vertical direction. Preferably, the inner cavity further includes the upper wind duct 41.

As shown in FIGS. 3 to 7, the lower wind duct 42 further includes a lower wind duct wall 422 which is clamped into the inner cavity. Preferably, the lower wind duct wall 422 may be completely or partially clamped into the inner cavity. Preferably, the lower wind duct wall 422 further includes a lower wind duct plate 4221 for leading wind from the wind outlet 411 of the upper wind duct into the lower wind duct 42, and the lower wind duct wall 422 has an n-shaped or 11-shaped front section. The 11-shaped structural design can effectively ensure that water can be drained quickly when water flows back to a position near to the wind outlet of the upper wind duct. When the lower wind duct wall 422 has an n-shaped front section, the wind outlet 411 of the upper wind duct corresponds to a bent portion of the n-shape, and the horizontal height of the highest point of the water tank 2 and/or the mist discharge passage 3 on a side fitted with the lower wind duct wall 422 may be or not higher than the highest point of the wind outlet 411 of the upper wind duct. When the lower wind duct wall 422 has a 11-shaped front section, the horizontal height of the highest point of the water tank 2 and/or the mist discharge passage 3 on a side fitted with the lower wind duct wall 422 is at least higher above 1 mm (preferably, 8 mm to 20 mm) than the highest point of the wind outlet 411 of the upper wind duct so as to reserve the housing without the inner cavity to close the opening at the upper end of the 11-shape. In this structural design, it is effectively ensured that, when the lower wind duct wall 422 has a 11-shaped front section, by fitting the lower wind duct wall 422 with the inner cavity in the water tank and/or the inner cavity in the mist discharge passage, wind may be led from the wind outlet 411 of the upper wind duct into the lower wind duct 42. Moreover, in this case, the horizontal height of the enclosure 7 above the position of the wind outlet 411 of the upper wind duct should at least reach a horizontal height where the highest point of the inner cavity can be sealed. The lower wind duct wall has guidance and positioning functions and is advantageous for the user to put back the water tank. Moreover, the lower wind duct wall can effectively prevent wind from the wind outlet of the upper wind duct from dispersing through the clearances among the enclosure, the water tank and the mist discharge passage, so that it is advantageous for increasing the wind strength and improving the working efficiency of the fan.

As shown in FIGS. 1 to 5, the mist discharge passage 3 and the water tank 2 are arranged independently, a cavity is formed in the water tank 2, and the mist discharge passage 3 is completely or partially located within the cavity. Preferably, the mist discharge passage 3 is arranged outside the water tank 2, and is completely separated from or completely or partially integrated with the water tank 2. Preferably, the mist discharge passage 3 may be completely separated from or completely or partially integrated with the enclosure 7. Preferably, the mist discharge passage 3 is completely separated from both the enclosure 7 and the water tank 2. Preferably, a cavity for accommodating the mist discharge passage 3 is formed on an outer wall of the water tank 2. The cavity functions as a reinforcing rib, so that it is advantageous to improve the mechanical strength of the water tank, it is convenient for the user to take out the water tank for feeding water and put the water tank back in the humidifier, and both the positioning and guidance functions are realized. Here, the independent arrangement includes, but is not limited to, the following situations: the mist discharge passage and the water tank should be two disconnected components, so that the user can separately take out the water tank and the mist discharge passage from the humidifier and it is disadvantageous for disassembling and cleaning impurities, water scale and the like. In this structural design, it is also possible that the water tank is arranged around the mist discharge passage or the mist discharge passage is arranged outside the water tank.

Preferably, the humidifier further includes a heating device 8. A water inlet 20 is further formed in an upper portion of the water tank 2. The mist discharge passage 3 is arranged right above the atomizer 12 so that a water energy column generated by the atomizer 12 during its operation is located within the mist discharge passage 3. The fan 5 blows out vapor generated by the heating device and water mist generated by the atomizer 12. Preferably, the mist discharge passage 3 is arranged in the vertical direction, and a plane of an edge of a mist inlet of the mist discharge passage 3 is parallel to the horizontal plane. In this structural design, the energy column directly faces the hollow cavity of the mist discharge passage, so that it can be ensured that the water energy column generated by the atomizer is released within the mist discharge passage and the energy of the energy column is prevented from impacting and beating the components. Even if the water level in the atomizer rises or the water level in the atomizer lowers due to the water leakage from the water tank, the damage from the energy column can be avoided effectively, and the service life of the components of the humidifier is thus improved. Moreover, in this structural design, in case of continuous water leakage from the water tank, the water energy column raised due to the rise of the water level can be guided and normalized by the mist discharge passage, and the damage from the energy column is thus relieved.

Embodiment 1

As shown in FIGS. 8 to 12, the water flow control device includes a detection and driving mechanism 211 and a water outlet portion 212. The water outlet portion 212 is arranged at the water outlet, and has a first water outlet hole 21201 and a second water outlet hole 21202 which are connected in series. Valves are provided at the first water outlet hole 21201 and the second water outlet hole 21202, respectively. The valves act as per a signal generated by the detection and driving mechanism 211 to open or close the first water outlet hole 21201 and the second water outlet hole 21202. The valves are able to separately close the first water outlet hole 21201 and the second water outlet hole 21202. The first water outlet hole 21201 and the second water outlet hole 21202 which are connected in series, so that water in the water tank 2 can flow into the water storage chamber 11 successively through the first water outlet hole 21201 and the second water outlet hole 21202. Preferably, an edge of the water outlet extends downward to form a bushing. Internal threads are formed on the bushing, and external threads are formed on the periphery of the water outlet portion 212. The bushing at the water outlet is in threaded connection to the water outlet portion 212. In order to prevent water in the water tank 2 from leaking into the gap between the bushing at the water outlet and the water outlet portion 212, a sealing member may also be provided at a junction of the bushing at the water outlet with the water outlet portion 212, or the water outlet and the water outlet portion 212 are formed integrally. When one of the water outlet holes cannot work normally since it is damaged by components or occluded by impurities in water, the other water outlet hole still can work normally. Moreover, since valves are provided at the two water outlet holes connected in series, the probability of water leakage from the water tank of the humidifier is reduced greatly, and the safety coefficient of the humidifier is increased. Preferably, the water outlet portion 212 has a water flow cavity 21210.

As shown in FIGS. 8 to 12, each of the valves includes a valve seat 2121, a valve core 2122, a water seal 2123 and a restoration member 2124. The valve core 2122 acts as per a signal generated by the detection and driving mechanism 211 to open or close the first water outlet hole 21201 and the second water outlet hole 21202 via the water seal 2123 and the restoration member 2124. The detection and driving mechanism 211 in the water flow control device can generate a water shortage signal when the amount of water in the water storage chamber 11 is insufficient, the valve core 2122 acts as per the signal generated by the detection and driving mechanism 211 to open the first water outlet hole 21201 and the second water outlet hole 21202 via the water seal 2123, and water in the water tank 2 flows into the water storage chamber 11. The detection and driving mechanism 211 can generate a water supply stop signal when the amount of water in the water storage chamber 11 reaches a predetermined value, the valve core 2122 acts as per the signal generated by the detection and driving mechanism 211 to close the first water outlet hole 21201 and the second water outlet hole 21202 via the water seal 2123 and the restoration member 2124, and water in the water tank 2 stops flowing into the water storage chamber 11. Preferably, the restoration member 2124 is a spring.

As shown in FIGS. 9 to 12, the valve core 2122 includes a first valve core 21221 and a second valve core 21222. The water seal 2123 includes a first water seal 21231 and a second water seal 21232. The first valve core 21221 is connected to the first water seal 21231, and the second valve core 21222 is connected to the second water seal 21232. A linkage mechanism is provided 21220 between the first valve core 21221 and the second valve core 21222. When the first water outlet hole 21202 and the second water outlet hole 21202 are opened, the linkage mechanism 21220 allows the displacement of the second water seal 21232 relative to the second water outlet hole 21202 to be greater than the displacement of the first water seal 21231 relative to the first water outlet hole 21201.

Figure 9:
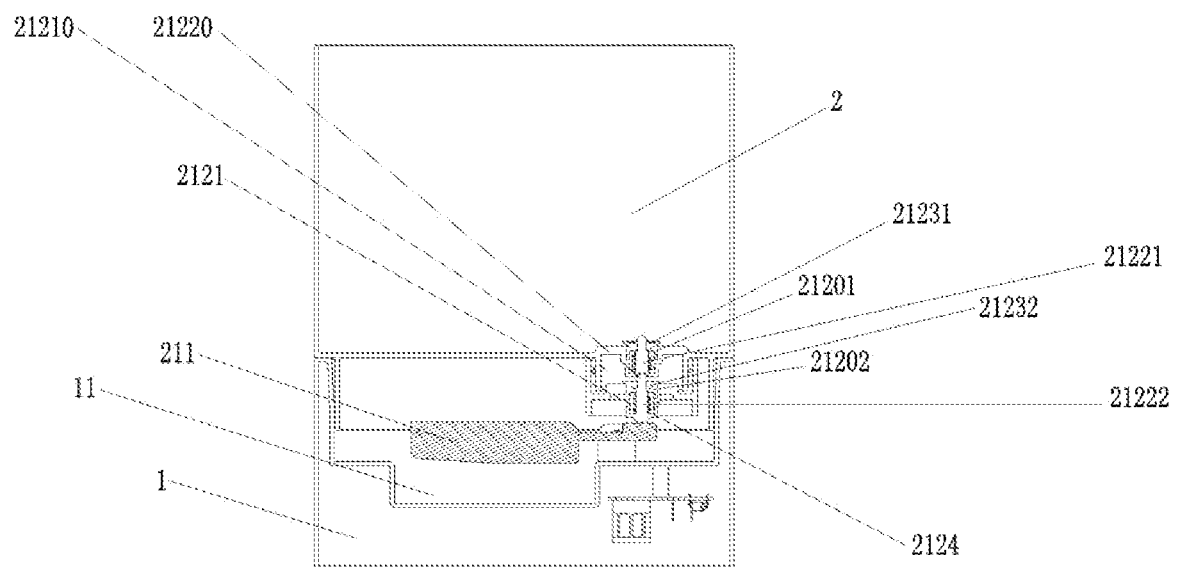
FIG. 9 is a cross-sectional view of the water outlet portion of the humidifier in Embodiment 1 of the present application.

As shown in FIG. 9, the linkage mechanism 21220 is an ejector formed on the top of the second valve core 21222, and the ejector is fitted with the bottom of the first valve core 21221; and, the first water seal 21231 is located above the first water outlet hole 21201 and the second water seal 21232 is located above the second water outlet hole 21202. Preferably, the first water seal 21231 is fixedly connected to the top of the first valve core 21221, and the second water seal 21232 is fixedly connected to the top of the second valve core 21222. Preferably, there is a certain distance from the ejector to the bottom of the first valve core 21221. In this structural design, for example, when the second valve cannot be rebounded successfully since the spring is damaged or the detection and driving mechanism is failed, the rebound of the first valve core will not be influenced greatly.

In the technical solutions provided by the present application, when the detection and driving mechanism generates a water shortage signal, a floater in a water shortage pool moves down and drives a lever connected thereto to move about an axis. Since the opposite end of the lever connected to the floater is resisted against the second valve core, the second valve core also moves up to allow the spring to be compressed. After the second valve core is ejected, the second valve core drives the second water seal to leave the second water outlet hole, so that the second water outlet hole is opened. The second valve core continuously moves up, the first valve core is ejected by the ejector on the top of the second valve core, and the first valve core drives the first water seal to leave the first water outlet hole, so that the first water outlet hole is opened. Water in the water tank flows into the water flow cavity through the first water outlet hole, and then flows from the water flow cavity into the water storage chamber through the second water outlet hole. When the detection and driving mechanism generates a water supply stop signal, the floater in the water storage pool moves up, the second valve core and the first valve core move down due to the spring, and the second water seal and the first water seal close the second water outlet hole and the first water outlet hole, respectively, so that water in the water tank stops flowing into the water storage chamber. Research has shown that the probability of water leakage in an existing single-valve seal structure is one thousandth to three thousandth. In the technical solutions provided by the present application, by using a double-valve structure, when one of water outlet holes cannot be closed normally due to the damage of components of the humidifier or the impurities in water, it still can be effectively ensured that humidifier can work normally without water leakage. Moreover, the double-valve structure of the present application can decrease the probability of water leakage of the humidifier to between one millionth and ten millionth, so that the reliability of the machine is improved greatly and the humidifier is higher in safety coefficient and more excellent in performance.

Embodiment 2

Except for the following description, the structure in this embodiment is the same as that in Embodiment 1.

Figure 10:
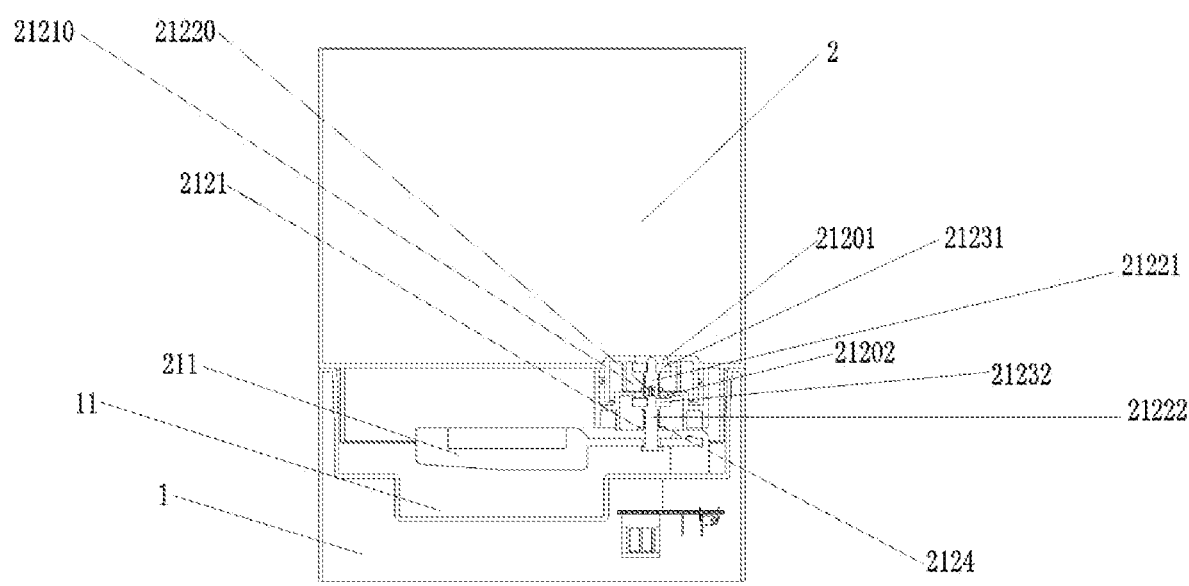
FIG. 10 is a cross-sectional view of the water outlet portion of the humidifier in Embodiment 2 of the present application.

As shown in FIG. 10, the linkage mechanism 21220 is a soft linkage member arranged on the top of the second valve core 21222, and the soft linkage member is inserted into the bottom of the first valve core 21221; and, the first water seal 21231 is located below the first water outlet hole 21201 and the second water seal 21232 is located below the second water outlet hole 21202. Preferably, the first water seal 21231 is fixedly connected to the top of the first valve core 21221, and the second water seal 21232 is fixedly connected to the top of the second valve core 21222.

In the technical solutions provided by the present application, when the detection and driving mechanism generates a water shortage signal, a floater in a water shortage pool moves down and drives a lever connected thereto to move about an axis. Since one end of the lever connected to the floater is also connected to the second valve core, the second valve core also moves down to allow the spring to be compressed. After the second valve core is pulled down, the second valve core drives the second water seal to leave the second water outlet hole, so that the second water outlet hole is opened. The second valve core continuously moves down, the first valve core is pulled down by the soft linkage member on the top of the second valve core, and the first valve core drives the first water seal to leave the first water outlet hole, so that the first water outlet hole is opened. Water in the water tank flows into the water flow cavity through the first water outlet hole, and then flows from the water flow cavity into the water storage chamber through the second water outlet hole. When the detection and driving mechanism generates a water supply stop signal, the floater in the water storage pool moves up, the second valve core and the first valve core move up due to the spring, and the second water seal and the first water seal close the second water outlet hole and the first water outlet hole, respectively, so that water in the water tank stops flowing into the water storage chamber. By the technical solutions provided by the present application, the reliability of the machine is improved and the humidifier is higher in safety coefficient and more excellent in performance.

Embodiment 3

Except for the following description, the structure in this embodiment is the same as that in Embodiment 1.

Figure 11:
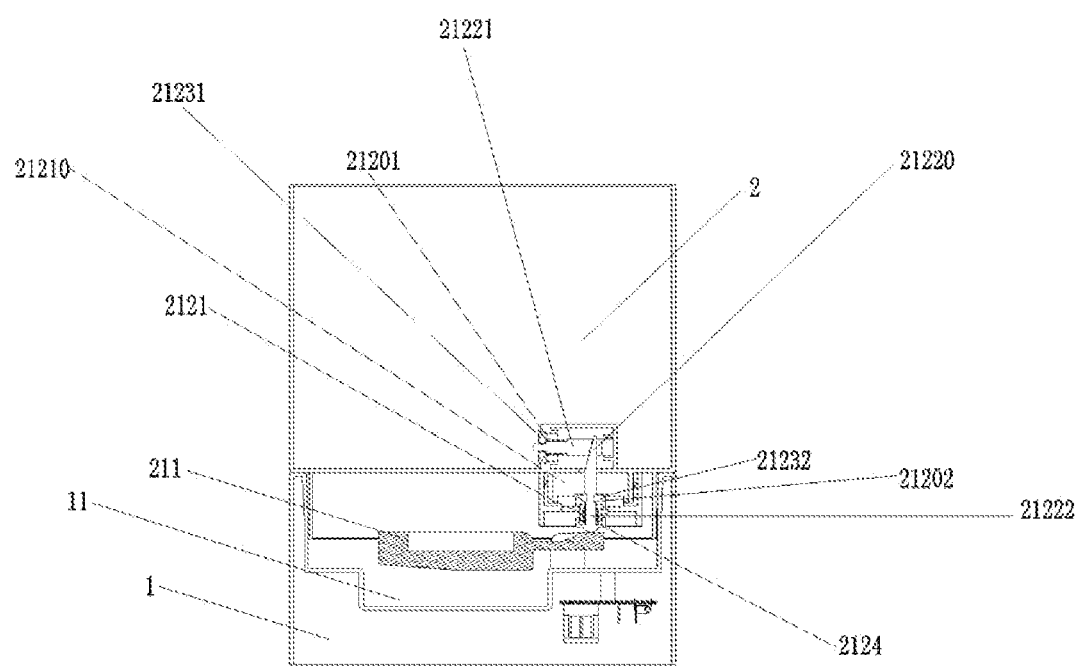
FIG. 11 is a cross-sectional view of the water outlet portion of the humidifier in Embodiment 3 of the present application.

As shown in FIG. 11, the linkage mechanism 21220 includes a bevel provided on the second valve core 21222 and a bevel chute provided on the first valve core 21221, and the bevel is inserted into the bevel chute and able to drive the first valve core 21221 to move; and, the first valve core 21221 and the second valve core 21222 are arranged at an angle. Preferably, the first valve core 21221 is arranged in the horizontal direction and the second valve core 21222 is arranged in the vertical direction, that is, the first valve core 21221 and the second valve core 21222 are arranged at 90°. Preferably, the first water seal 21231 is located in front of the first water outlet hole 21201, and the second water seal 21232 is located above the second water outlet hole 21202. Preferably, the first water seal 21231 is fixedly connected to the top of the first valve core 21221.

In the technical solutions provided by the present application, when the detection and driving mechanism generates a water shortage signal, a floater in a water shortage pool moves down and drives a lever connected thereto to move about an axis. Since the opposite end of the lever connected to the floater is resisted against the second valve core, the second valve core also moves up to allow the spring to be compressed. After the second valve core is ejected, the second valve core drives the second water seal to leave the second water outlet hole, so that the second water outlet hole is opened. The second valve core continuously moves up, the first valve core is driven to move forward by sliding the bevel on the top of the second valve core within the bevel chute on the first valve core, and the first valve core drives the first water seal to leave the first water outlet hole, so that the first water outlet hole is opened. Water in the water tank flows into the water flow cavity through the first water outlet hole, and then flows from the water flow cavity into the water storage chamber through the second water outlet hole. When the detection and driving mechanism generates a water supply stop signal, the floater in the water storage pool moves up, the second valve core moves down due to the spring, the first valve core moves backward due to the spring, and the second water seal and the first water seal close the second water outlet hole and the first water outlet hole, respectively, so that water in the water tank stops flowing into the water storage chamber. By the technical solutions provided by the present application, the reliability of the machine is improved and the humidifier is higher in safety coefficient and more excellent in performance.

Embodiment 4

Except for the following description, the structure in this embodiment is the same as that in Embodiment 1.

Figure 12:
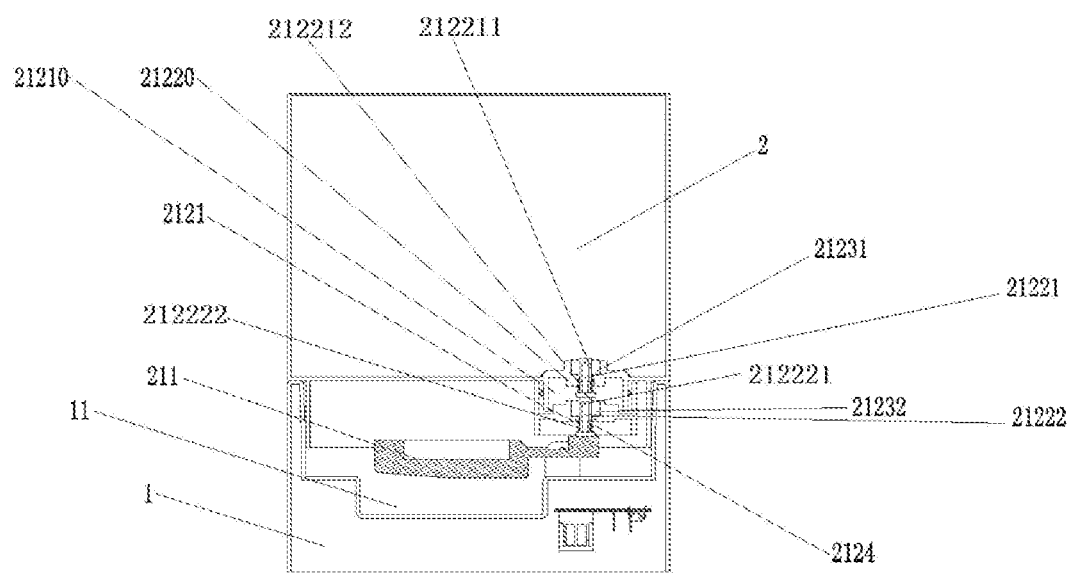

As shown in FIG. 12, the valve core 2122 includes a first valve core 21221 and a second valve core 21222. The water seal 2123 includes a first water seal 21231 and a second water seal 21232. The first valve core 21221 is fitted with the first water seal 21231, and the second valve core 21222 is fitted with the second water seal 21232. A linkage mechanism is provided 21220 between the first valve core 21221 and the second valve core 21222. The linkage mechanism 21220 is an ejector formed on the top of the second valve core 21222, and the ejector is fitted with the bottom of the first valve core 21221. Preferably, there is a certain distance from the ejector to the bottom of the first valve core 21221. In this structural design, for example, when the second valve cannot be rebounded successfully since the spring is damaged or the detection and driving mechanism is failed, the rebound of the first valve core will not be influenced greatly.

As shown in FIG. 12, a first water flow hole 212211 and a first release hole 212212 are formed on the first valve core 21221, and a second water flow hole 212221 and a second release hole 212222 are formed on the second valve core 21222; and, the first water flow hole 212211 is fitted with the first water seal 21231, and the second water flow hole 212221 is fitted with the second water seal 21232. When the first water outlet hole 21201 and the second water outlet hole 21202 are closed, the first water seal 21231 closes the first water flow hole 212211 and the second water seal 21232 closes the second water flow hole 212221. When the first water outlet hole 21201 and the second water outlet hole 21202 are opened, the first water flow hole 212211 leaves the first water seal 21231, the second water flow hole 212221 leaves the second water seal 21231, and water in the water tank 2 flows into the water storage chamber 11 through the first water outlet hole 21201 and the second water outlet hole 21202. Each of the first valve core 21221 and the second valve core 21222 has a hollow structure. The hollow structures form a first water flow passage and a second water flow passage, respectively. The first water flow hole 212211 and the first release hole 212212 are communicated with the first water flow passage, and the second water flow hole 212221 and the second release hole 212222 are communicated with the second water flow passage. Water in the water tank 2 flows into the first valve core 21221 through the first water flow hole 212211 and is drained from the first valve core 21221 through the first release hole 212212. Similarly, water flows into the second valve core 21222 through the second water flow hole 212221 and is then drained from the second valve core 21222 through the second release hole 212222. Preferably, the first water seal 21231 is fixedly arranged an inner edge of the first water outlet hole 21201, and the second water seal 21232 is fixed arranged on an inner edge of the second water outlet hole 21202.

As shown in FIG. 12, the inner diameter of the first water flow hole 212211 is less than that of the second water flow hole 212221. In this structural design, it is effectively ensured that water in the water flow cavity will not be retained therein.

Although the embodiments of the present application have been described above, it can be understood by a person of ordinary skill in the art that transformations can be made to the embodiments without departing from the principle and spirit of the present application, and the projection scope of the present application shall be defined by the appended claims and equivalents thereof.

The invention claimed is:

1. A humidifier, comprising: a pedestal, a water tank having a water outlet formed thereon, a water storage chamber provided on the pedestal, an atomizer mounted in the water storage chamber, a mist discharge passage by which mist generated by the atomizer is discharged from the humidifier, and a water flow control device for controlling the opening or closing of the water outlet to enable water in the water tank to enter the water storage chamber, wherein the humidifier further comprises an enclosure which is open in the enclosure's upper portion and used for avoiding water leakage, the water tank is detachably arranged within the enclosure, and a lowest point at an upper end of the enclosure is higher than a highest water level in the water tank after leakage, wherein the water flow control device comprises a floater in a water shortage pool connected to a lever, and a water outlet portion; the water outlet portion is arranged at the water outlet, and has a first water outlet hole and a second water outlet hole which are connected in series; valves are provided at the first water outlet hole and the second water outlet hole, respectively; the valves act as per a signal generated by the floater to open or close the first water outlet hole and the second water outlet hole; the valves are able to separately close the first water outlet hole and the second water outlet hole.

2. The humidifier according to claim 1, wherein each of the valves comprises a valve seat, a valve core, a water seal and a spring, and the valve core acts as per a signal generated by the floater to open or close the first water outlet hole and the second water outlet hole via the water seal and the spring.

3. The humidifier according to claim 2, wherein the valve core comprises a first sub valve core and a second sub valve core; the water seal comprises a first sub water seal and a second sub water seal; the first sub valve core is connected to the first sub water seal, and the second sub valve core is connected to the second sub water seal; an ejector or a soft linkage member is provided between the first sub valve core and the second sub valve core; and, when the first water outlet hole and the second water outlet hole are opened, the ejector or the soft linkage member allows the displacement of the second sub water seal relative to the second water outlet hole to be greater than the displacement of the first sub water seal relative to the first water outlet hole.

4. The humidifier according to claim 3, wherein the ejector is formed on the top of the second sub valve core, the ejector is fitted with the bottom of the first sub valve core; the first sub water seal is located above the first water outlet hole and the second sub water seal is located above the second water outlet hole.

5. The humidifier according to claim 3, wherein the soft linkage member is provided on the top of the second sub valve core, and the soft linkage member is inserted into the bottom of the first sub valve core; and, the first sub water seal is located below the first water outlet hole and the second sub water seal is located below the second water outlet hole.

6. The humidifier according to claim 3, wherein the ejector or the soft linkage member comprises a bevel provided on the second sub valve core and a bevel chute provided on the first sub valve core, and the bevel is inserted into the bevel chute and able to drive the first sub valve core to move; and, the first sub valve core and the second sub valve core are arranged at an angle.

7. The humidifier according to claim 2, wherein the valve core comprises a first sub valve core and a second sub valve core; the water seal comprises first sub water seal and a second sub water seal; the first sub valve core is fitted with the first sub water seal, and the second sub valve core is fitted with the second sub water seal; an ejector is provided between the first sub valve core and the second sub valve core; the ejector is formed on the top of the second sub valve core; and, the ejector is fitted with the bottom of the first sub valve core.

8. The humidifier according to claim 7, wherein a first water flow hole and a first release hole are formed on the first sub valve core, and a second water flow hole and a second release hole are formed on the second sub valve core; the first water flow hole is fitted with the first sub water seal, and the second water flow hole is fitted with the second sub water seal; each of the first sub valve core and the second sub valve core has a hollow structure; the hollow structures form a first water flow passage and a second water flow passage, respectively; the first water flow hole and the first release hole are communicated with the first water flow passage, and the second water flow hole and the second release hole are communicated with the second water flow passage.

9. The humidifier according to claim 8, wherein the inner diameter of the first water flow hole is less than that of the second water flow hole.

* * * * *